United States Patent
Schmidt

(10) Patent No.: US 11,919,624 B2
(45) Date of Patent: Mar. 5, 2024

(54) LANDING GEAR DOOR INSTALLATION

(71) Applicant: Safran Landing Systems Canada Inc., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 0 days.

(21) Appl. No.: 17/695,214

(22) Filed: Mar. 15, 2022

(65) Prior Publication Data
US 2023/0294821 A1    Sep. 21, 2023

(51) Int. Cl.
B64C 25/20 (2006.01)
B64C 25/16 (2006.01)
B64C 25/24 (2006.01)
B64C 25/26 (2006.01)

(52) U.S. Cl.
CPC ............. *B64C 25/20* (2013.01); *B64C 25/16* (2013.01); *B64C 25/24* (2013.01); *B64C 25/26* (2013.01)

(58) Field of Classification Search
CPC ......... B64C 25/20; B64C 25/16; B64C 25/24; B64C 25/26; B64C 2025/003
See application file for complete search history.

(56) References Cited

U.S. PATENT DOCUMENTS

| | | | | |
|---|---|---|---|---|
| 4,712,752 A * | 12/1987 | Victor | ........................ | B64C 3/28 244/129.1 |
| 2005/0103937 A1 * | 5/2005 | Briancourt | .............. | B64C 25/16 244/129.5 |
| 2006/0032981 A1 * | 2/2006 | Fort | ........................ | B64C 25/16 244/129.4 |
| 2009/0008501 A1 * | 1/2009 | Chow | ..................... | B64C 25/16 244/100 R |
| 2010/0006696 A1 * | 1/2010 | Chow | ..................... | B64C 25/16 244/1 N |
| 2011/0186680 A1 * | 8/2011 | Ekmedzic | ............... | B64C 25/10 244/102 R |
| 2016/0176513 A1 * | 6/2016 | Gallant | ................. | B64C 1/0683 244/119 |
| 2017/0021919 A1 | 1/2017 | Dazet | | |
| 2017/0166300 A1 * | 6/2017 | Cros | ....................... | B64C 25/20 |
| 2019/0382102 A1 | 12/2019 | Senechal et al. | | |

OTHER PUBLICATIONS

International Search Report and Written Opinion dated May 18, 2023, issued in corresponding International Application No. PCT/CA2023/050298, filed Mar. 7, 2023, 8 pages.

* cited by examiner

*Primary Examiner* — Medhat Badawi
*Assistant Examiner* — Vicente Rodriguez
(74) *Attorney, Agent, or Firm* — CHRISTENSEN O'CONNOR JOHNSON KINDNESS PLLC

(57) ABSTRACT

An aircraft has retractable landing gear configured to reciprocate between a deployed position and a stowed position. A landing gear door installation includes a first door rotatably coupled to the aircraft about a first axis for movement between a raided position and lowered position. The door installation further includes a second door located aft of the first door and coupled to the aircraft for movement between a first position when the landing gear is in the stowed position, and a second position when the landing gear is in the deployed position. A portion of the first door overlaps a portion of the second door when the first door is in the raised position and the second door is in the first position so that the first door blocks deployment of the second door to the second position.

10 Claims, 4 Drawing Sheets

LANDING GEAR DOOR INSTALLATION

BACKGROUND

Typical aircraft landing gear is reciprocal between a deployed position and a stowed position. In the deployed position, the landing gear extends downward from the aircraft to engage a ground surface and support the aircraft. In the stowed position, the landing gear has retracted into a landing gear bay within the wing and/or the fuselage of the aircraft. In order to improve aerodynamic efficiency, landing gear doors cover the landing gear bay when the landing gear is in the stowed position. Exemplary embodiments of a landing gear with actuated doors is disclosed in U.S. Patent Application Publication No. 2019/0382120 (Senechal et al.), filed Jun. 18, 2019, and currently assigned to Safran Landing Systems, the disclosure of which is incorporated in its entirety herein.

FIG. 1 shows an example of a typical aircraft 10 with a known landing gear 20 and landing gear door installation 30. In the example shown in FIG. 1, the landing gear 20 is deployed, and the landing gear door installation 30 is open. The aircraft 10 includes a fuselage 12 with wings 14 extending therefrom. Retractable landing gear 20 is deployed to support the aircraft 10 when the aircraft is on the ground, for example, during take-off, landing, and taxiing maneuvers. The landing gear 20 includes a main fitting 22 coupled to the fuselage 12 and/or the wing 14. The main fitting 22 extends downward in the deployed position, and a side stay 24 is coupled to the main fitting and the fuselage 12 and/or wing 14 to maintain the main fitting 22 in the extended position when the landing gear 20 is deployed. One or more wheels 26 are rotatably associated with the main fitting 22 for rolling engagement with the ground to support the aircraft 10.

During flight, the landing gear 20 retracts into a landing gear bay 16 to be stowed out of the airstream until the landing gear is extended again to the deployed position for landing. The door installation 30 includes one or more doors that close to cover the landing gear bay 16 when the landing gear 20 is stowed. By covering the landing gear bay 16, the door installation 30, when in the closed position, maintains the aerodynamic profile of the fuselage 12 and/or wings 14 and also protects components located within the landing gear bay.

In the illustrated example, the door installation 30 includes an outboard door 40 and an inboard door 50. The outboard door 40 includes a panel 42 rotatably coupled to the wing 14 and coupled to the landing gear 20 by a linkage 44. As the landing gear 20 reciprocates between the stowed and deployed position, the linkage 44 rotates the outboard panel 42 between the retracted and extended positions, respectively.

Still referring to FIG. 1, the inboard door 50 includes a panel 52 rotatably mounted to the fuselage 12 about an axis 56 defined by a hinge 54. An actuator 58 is coupled to both the panel 52 and structure within the landing gear bay 16. When the landing gear 20 is to be extended for landing, the actuator 58 drives the inboard door 50 to the extended position to provide clearance for the landing gear 20 deployment. To stow the landing gear 20, the actuator 58 drives the inboard door 50 to the retracted position. With the landing gear 20 stowed and the inboard door 50 in the retracted position, one or more uplocks (not shown), i.e., mechanical latches, engage to secure the inboard door in the stowed position. When the landing gear 20 is to be deployed, the uplocks disengage so that the actuator 58 can drive the inboard door 50 to the deployed position.

The hinge 54 and the axis 56 of rotation of the inboard door 50 extend in an approximately streamwise direction, i.e., forward/aft relative to the aircraft 10. By rotating the panel 52 about a generally streamwise axis, the projected area of the inboard door 50 is minimized when the door is extended, which in turn reduces the aerodynamic loads on the extended door. The reduced loads allow for lighter panels 52 and associated structure.

Some aircraft (especially supersonic aircraft) can suffer from severe consequences if a landing gear door were to inadvertently deploy in flight. A traditional solution to this problem is to ensure that hydraulic power is isolated from the extension/retraction system above a certain airspeed. However, this traditional solution does not address potential mechanical failures of the uplocks or the door components, which could also result in inadvertent deployment.

SUMMARY

Embodiments of a door installation for aircraft landing gear are set forth below according to technologies and methodologies of the present disclosure. These landing gear installations are configured such that a failure of a single component, such as a door uplock, does not result in a hazardous or catastrophic consequence, i.e., uncommanded door opening in flight. That is, no single latch or component becomes flight critical.

A first representative embodiment of a door installation is included on an aircraft having retractable landing gear, wherein the landing gear is configured to reciprocate between a stowed position and a deployed position. The door installation comprises a first door rotatably coupled to the aircraft about a first axis for movement between a raised position and lowered position. The door installation further comprises a second door located aft of the first door and coupled to the aircraft for movement between a first position when the landing gear is in the stowed position, and a second position when the landing gear is in the deployed position. The first and second doors are arranged such that a portion of the first door overlaps a portion of the second door when: (1) the first door is in the raised position; and (2) the second door is in the first position. This arrangement allows the first door to block deployment of the second door.

In any embodiment, the first axis is perpendicular to butt-line zero of the aircraft.

In any embodiment, the second door is rotatably coupled to the aircraft about a second axis.

In any embodiment, the second axis is parallel to butt-line zero of the aircraft.

In any embodiment, the first door comprises a first uplock that is selectively engaged to maintain the first door in the raised position, and the second door comprises a second uplock that is selectively engaged to maintain the second door in the first position.

In any embodiment, the first uplock is configured to maintain the first door in the raised position in the event of a failure of the second uplock so that engagement of the first door prevents the second door from moving to the second position.

In any embodiment, the first door is arranged such that aerodynamic forces on the first door prevent the first door from moving to the lowered position in the event of a failure of the first uplock.

In any embodiment, an actuator is operable coupled to the first door to selectively drive the first door between the raised position and the lowered position.

In any embodiment, the actuator is configured to selectively lower the first door independent of landing gear deployment.

In any embodiment, a forward edge of the second door comprises a joggle sized and configured to accommodate an aft edge of the first door.

In any embodiment, the first door further comprises a seal disposed on the aft edge, the seal engaging the second door when the first door is in the raised position and the second door is in the first position.

In any embodiment, the seal is one of a blade seal or a bulb seal.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of a door installation for aircraft landing gear are set forth below according to technologies and methodologies of the present disclosure. In an embodiment, a forward door at least partially overlaps a second door located aft of the forward door. The forward door is rotatable about a hinge that is arranged so that during flight conditions, the aerodynamic loads on the forward door keep the door in a closed or almost closed position in the event of a forward door uplock failure. The overlap of the forward door with the second door prevents the second door from deploying during flight in the event of a second door uplock failure.

Figure 1:
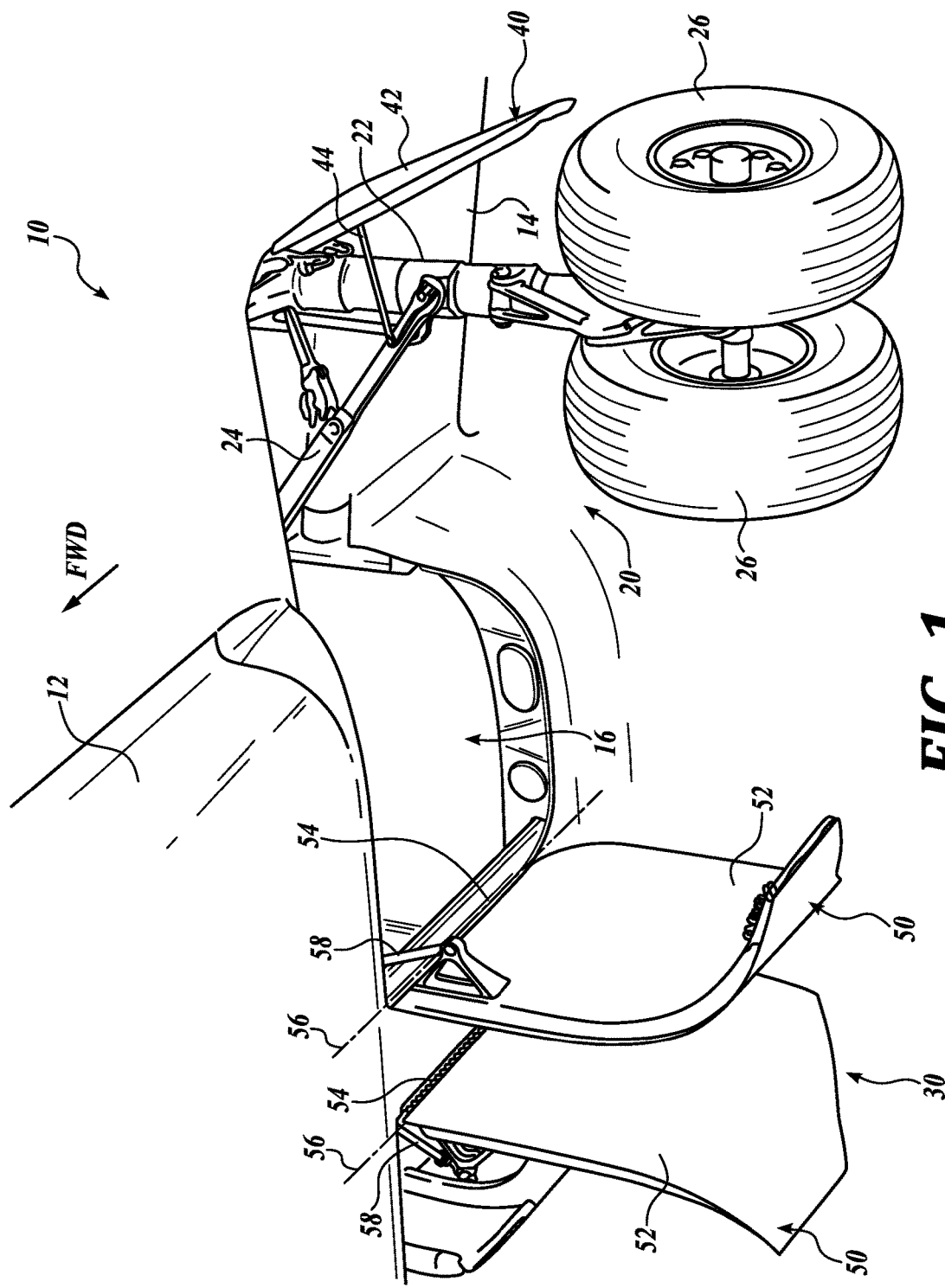
FIG. 1 shows a partial isometric view of an aircraft with a retractable landing gear and a known door installation, wherein the landing gear is in a deployed position and the door installation is open.
Figure 2:
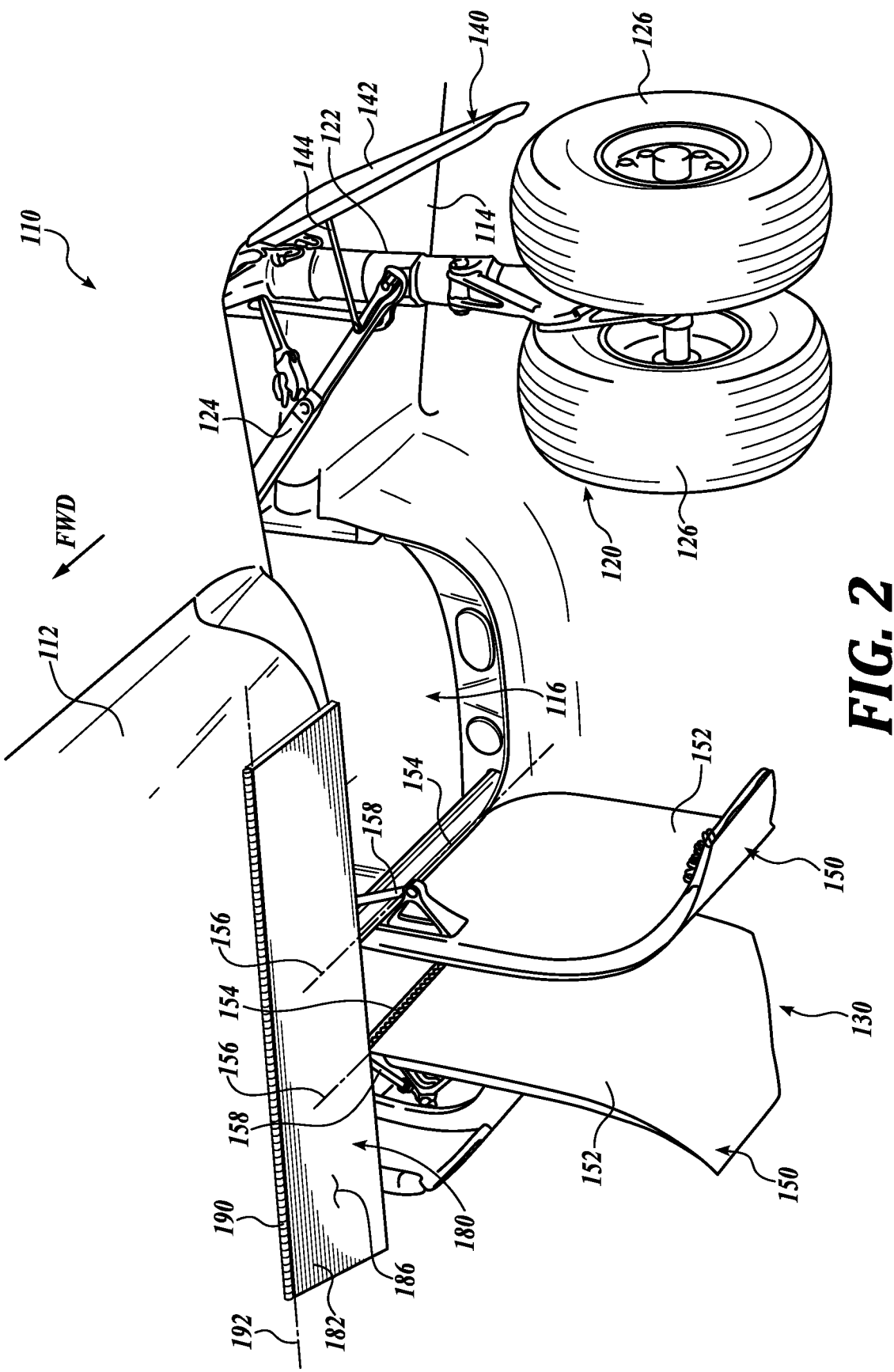
FIG. 2 shows a partial isometric view of an aircraft with a retractable landing gear and a representative embodiment of a door installation according to the present disclosure, wherein the landing gear is in the deployed position and the door installation is open.
Figure 3:
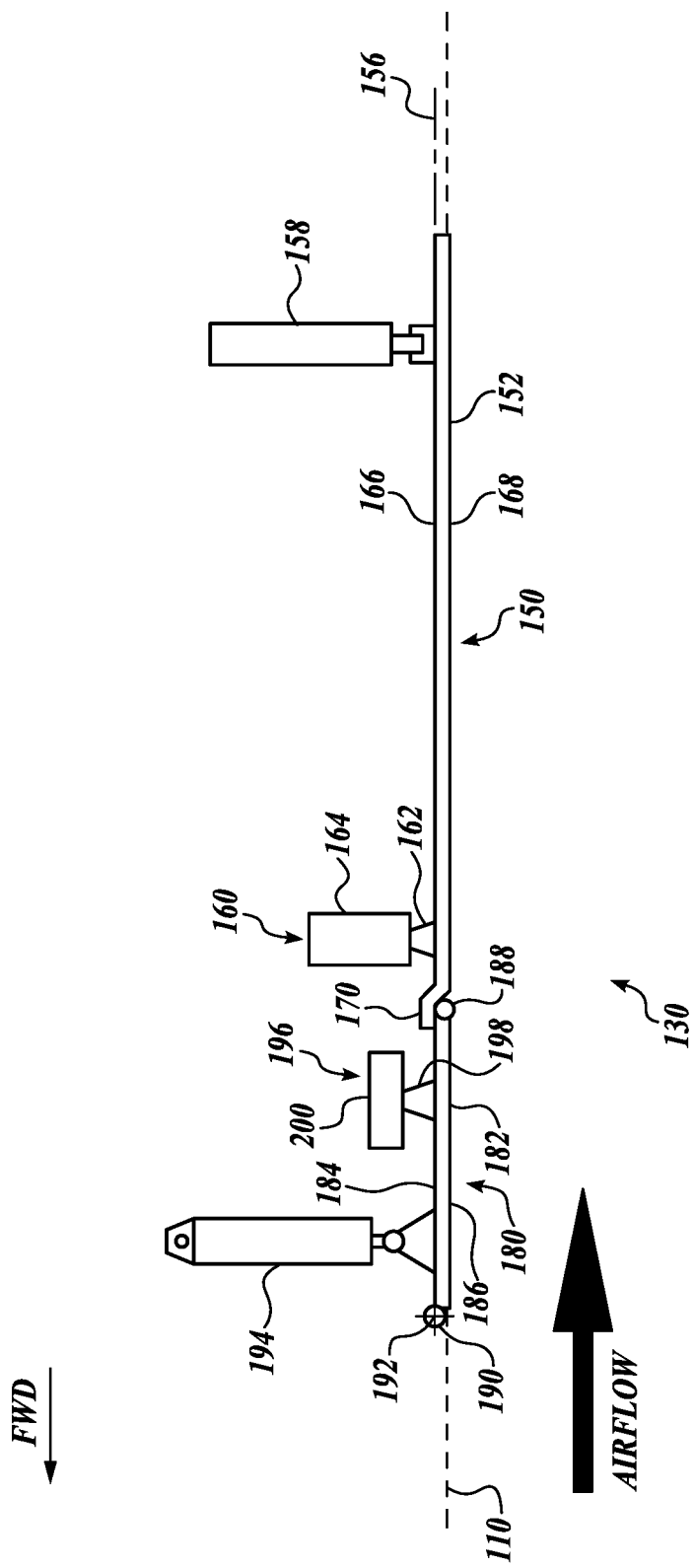
FIG. 3 shows a cross-sectional schematic side view of the door installation of FIG. 2 when the landing gear is in the stowed position and the door installation is closed.
Figure 4:
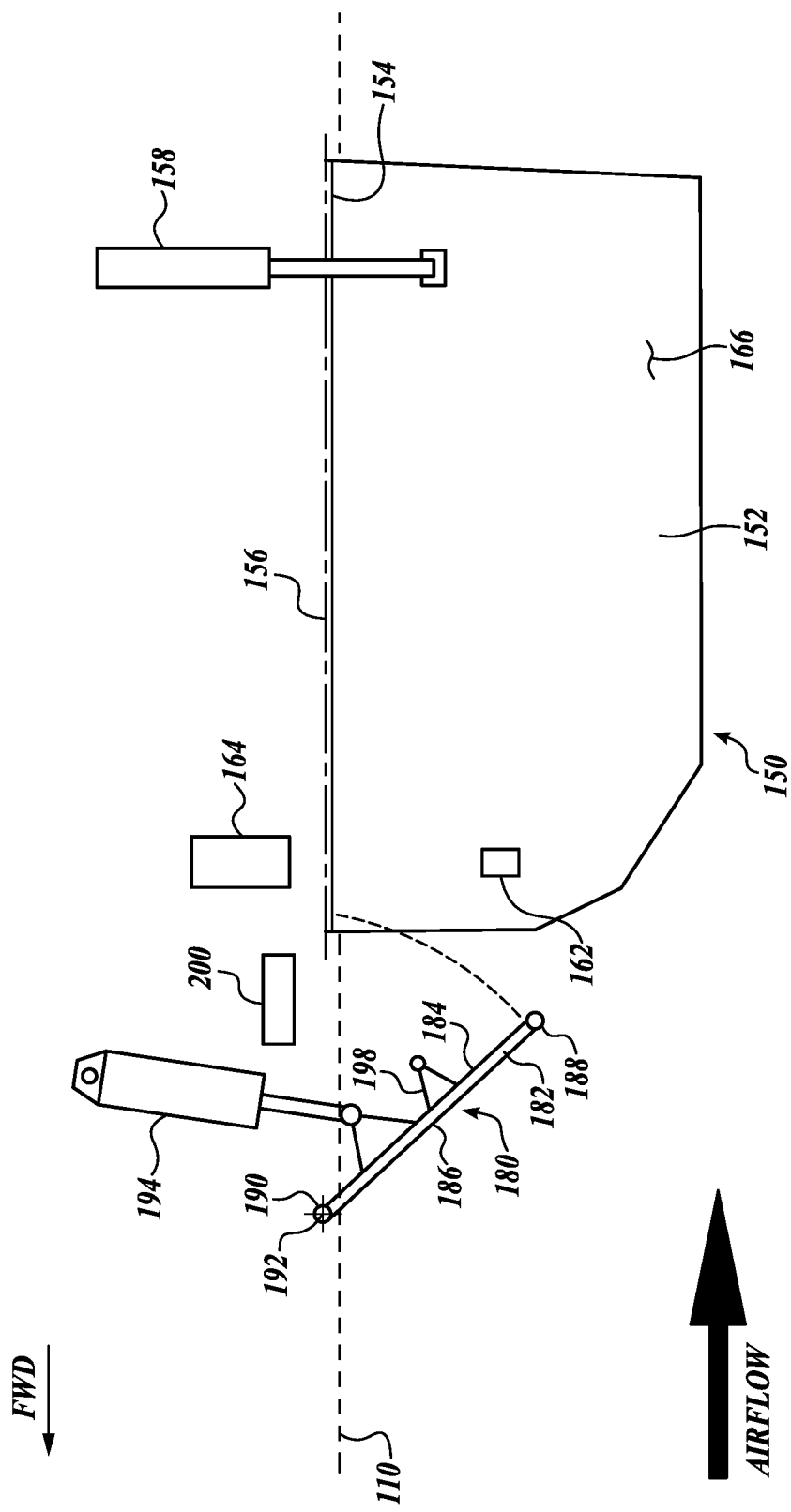
FIG. 4 shows a cross-sectional schematic side view of the door installation of FIG. 3 when landing gear is in a deployed position and the door installation is open.

FIGS. 2-4 show a representative embodiment of a door installation 130 for an aircraft 110 and landing gear 120 similar to the aircraft 10 and landing gear 20 shown in FIG. 1. For the sake of brevity, the illustrated embodiment will be described with the understanding that elements shown in FIG. 1 and indicated with reference numbers XX correspond to elements shown in FIGS. 2-4 and indicated with reference numbers 1XX, and the corresponding parts are similar excepts as otherwise noted. For example, panel 152 and actuator 158 shown in FIGS. 2-4 are similar to panel 52 and actuator 58, respectively, except as described.

Referring now to FIG. 2, the illustrated door installation 130 includes an outboard door 140 and an inboard door 150 that cooperate to cover the landing gear bay 116 when the landing gear 120 is in the stowed position. Unlike the door installation 30 shown in FIG. 1, the door installation 130 of FIG. 2 further includes a forward door 180 mounted for reciprocating movement between a raised position, shown in FIG. 3, and a lowered position, shown in FIGS. 2 and 4. As will be explained in further detail, when the landing gear 120 is stowed and the door installation 130 covers the landing gear bay 116, the forward door 180 positioned relative to the inboard door 150 to prevent an uncommanded opening in flight.

FIG. 3 shows a cross-sectional schematic side view of the landing gear door installation 130 of FIG. 2, wherein the landing gear 120 is stowed, and the door installation is covering the landing gear bay 116. The inboard door 150 includes a panel 152 with an inner surface 166 that faces the landing gear bay and an outer surface 168 that is exposed to the airflow. The panel 152 is formed with known materials and constructions, including metal skin, stiffeners, or any suitable combination thereof. The forward edge of the panel 152 has a joggle 170 sized and configured to accommodate an aft portion for the forward door 180.

One or more actuators 158 are operatively coupled to the panel 152 to selectively drive the inboard door 150 between the extended and retracted positions. In some embodiments, the actuator is a linear actuator, a rotary actuator, or any suitable actuator or combination of actuators. One or more uplocks 160 secure the inboard door 150 in the retracted position when the landing gear 120 is in the stowed position. In the illustrated embodiment, the uplock 160 includes a roller 162 mounted to the panel 152 and a latch 164 fixedly mounted relative to the fuselage 112. When the door installation 130 is in the closed position, the roller 162 lockingly engages the latch 164 to maintain the inboard door 150 in the retracted position while the landing gear 120 is stowed.

Still referring to FIG. 3, the forward door 180 includes a panel 182 constructed of known materials (i.e., metals, composites, etc.). The panel 182 is coupled to the aircraft 110 for reciprocating movement between a raised position, shown in FIG. 3, and a lowered position, shown in FIG. 4. The panel 182 includes an inner surface 184 and an outer surface 186. When the forward door 180 is in the raised position, the inner surface 184 faces the landing gear bay 116, and the outer surface 186 is exposed to the airstream.

In the illustrated embodiment, the panel 182 is rotatably coupled to the aircraft 110 about an axis 192 defined by a hinge 190. The hinge 190 is positioned at a forward edge of the panel 182 and is oriented perpendicular to butt-line zero of the aircraft 110. As used herein, butt-line zero is a vertical plane passing through the longitudinal centerline of the aircraft. As the forward door 180 moves from the raised position to the lowered position, the outer surface 186 of the panel 182 is more directly impinged by the airflow. The resulting aerodynamic loads on the panel 182 increase as the forward door moves closer to the lowered position and tend to rotate the forward door 180 toward the raised position.

Still referring to FIG. 3, one or more actuators 194 are operatively coupled to the panel 182 to selectively drive the forward door 180 between the raised position and the lowered position. In some embodiments, the actuator is a linear actuator, a rotary actuator, or any suitable actuator or combination of actuators. One or more uplocks 196 secure the forward door 180 in the raised position when the landing gear 120 is in the stowed position. Similar to the previously described uplock 160 for the inboard door 150, the uplock 196 includes a roller 198 mounted to the panel 182 and a latch 200 fixedly mounted relative to the fuselage 112. When the door installation 130 is in the closed position, the roller 198 lockingly engages the latch 200 to maintain the forward door 180 in the raised position while the landing gear 120 is stowed.

While the uplocks 160 and 196 are generally described as known uplocks that have a latch and a roller, it will be appreciated that other uplock configurations are possible. In some embodiments, the uplock can be a hydraulic lock in an actuator. In some embodiments, the uplock can be a mechanical claw or segment lock within an actuator. In some embodiments, the uplock can be any suitable uplock mechanism or combination of mechanisms, and such embodiments, should be considered within the scope of the present disclosure.

The forward door 180 is sized and configured to overlap a portion of the inboard door 150 when the landing gear 120 door installation is closed. In the illustrated embodiment, an aft end of the forward door 180 overlaps a forward end of the inboard door 150. In some embodiments, an aft end of the inner surface 184 of the forward door 180 engages the outer surface 168 of the inboard door 150 at the joggle 170, which has an offset approximately equal to the thickness of the aft end of the forward door 180. In some embodiments, a seal 188 is mounted to the aft end of the forward door 180. In these embodiments, the joggle 170 and the seal 188 provide improved continuity along the outer surface of the door installation 130 to reduce drag.

Referring now to FIG. 4, when the landing gear 120 is to be deployed, the forward door 180 is moved to the lowered position. To lower the forward door 180, the uplock latch 200 releases the uplock roller 198 to disengage the uplock 196. The actuator 194 then drives panel 182 downward about axis 192. With the forward door 180 in the lowered position, the uplock 160 of the inboard door 150 disengages, and the actuator 158 drives the inboard door to the extended position.

To move the door installation 130 from the open position to the closed position, the opening process is reversed. In this regard, the actuator 158 drives the panel 152 of the inboard door 150 to rotate about axis 156 until the inboard door is in the retracted position. With the inboard door 150 in the retracted position, the uplock 160 is engaged to secure the inboard door. The actuator 194 for the forward door 180 then drives the panel 182 to rotate about axis 192 to the raised position. The uplock 196 engages to secure the forward door 180 in the raised position, and the aft end of the forward door is positioned proximate to the forward end of the inboard door 150 so that the forward door blocks uncommanded extension of the inboard door 150.

It will be appreciated that the described sequence is exemplary only. In some embodiments the inboard door 150 starts to move toward the extended position before the forward door 180 is fully lowered. In some embodiments, the inboard door 150 starts to move toward the extended position as soon as the forward door 180 has moved toward the lowered position a sufficient amount to avoid interfering with the extension of the inboard door. In some embodiments, the uplocks 160 and 196 disengage at any time prior to the lowering and extension of the forward door 180 and inboard door 150, respectively. Similarly, the raising and retracting of the forward door 180 and inboard door 150, respectively, in addition to the engagement of the uplocks 160 and 196 is not limited to the described sequence but can include any sequence in which the forward door 180 does not interfere with retraction of the inboard door 150 and in which the uplocks are engaged after the forward door 180 and inboard door 150, reach the raised position and the retracted position, respectively.

Embodiments of the disclosed door installation 130 prevent uncommanded extension/deployment of the one or more landing gear doors in the event of an uplock failure (or failure of other door installation components, such as, for example, a hinge). In the event of a failure of the uplock 160 of the inboard door 150, the overlap of the forward door 180 at the leading edge of the inboard door maintains the inboard door in the retracted position. In the event of a failure of the actuator 194 of the forward door 180, the aerodynamic loads on the forward door maintain the forward door in a raised (or almost raised) position.

In some embodiments, the forward door 180 also functions as a speed brake. In these embodiments, the actuator 194 is configured to operate as a flight control actuator that selectively lowers the forward door 180 into the air stream to provide additional drag when desired. The amount of drag provided is selectively variable by controlling the extent to which the forward door 180 is lowered.

It will be appreciated that the disclosed embodiments are exemplary only and should not be considered limiting. In some embodiments, the size, number, position, and actuation of the landing gear doors can vary within the scope of the present disclosure. In some embodiments, the forward door overlaps more than one landing gear door to retain the doors in the event of a failure. In some embodiments, one or more of the landing gear doors rotates about an axis that is parallel to butt-line zero of the aircraft. In some embodiments, one or more of the landing gear doors do not rotate about a hinge, but instead are mounted for reciprocating movement by a linkage, track and roller system, or any other known configuration. In some embodiments the forward door hinge is not perpendicular to butt-line zero of the aircraft but is angled relative to aircraft centerline while the door is still urged to the raised position by aerodynamic forces during flight. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A door installation for an aircraft having retractable landing gear configured to reciprocate between a stowed position and a deployed position, the door installation comprising:
 a first door rotatably coupled to the aircraft about a fixed first axis for movement between a raised position and lowered position, the first door including a first uplock that is selectively engaged to maintain the first door in the raised position;
 an actuator operably coupled to an inner surface of the first door and configured to selectively drive the first door between the raised position and the lowered position; and
 a second door located aft of the first door and coupled to the aircraft for movement between a first position when the landing gear is in the stowed position, and a second position when the landing gear is in the deployed position, the second door including a second uplock that is selectively engaged to maintain the second door in the first position, wherein a portion of the first door overlaps a portion of the second door when the first door is in the raised position and the second door is in the first position so that the first door blocks deployment of the second door to the second position.

2. The door installation of claim 1, wherein the first axis is perpendicular to butt-line zero of the aircraft.

3. The door installation of claim 1, wherein the second door is rotatably coupled to the aircraft about a second axis.

4. The door installation of claim 3, wherein the second axis is parallel to butt-line zero of the aircraft.

5. The door installation of claim 1, wherein the first uplock is configured to maintain the first door in the raised position in the event of a failure of the second uplock so that engagement of the first door prevents the second door from moving to the second position.

6. The door installation of claim 5, wherein aerodynamic forces on the first door prevent the first door from moving to the lowered position in the event of a failure of the first uplock.

7. The door installation of claim 1, wherein the actuator is configured to selectively lower the first door independent of landing gear deployment.

8. The door installation of claim 1, wherein a forward edge of the second door comprises a joggle sized and configured to accommodate an aft edge of the first door.

9. The door installation of claim 8, wherein the first door further comprises a seal disposed on the aft edge, the seal engaging the second door when the first door is in the raised position and the second door is in the first position.

10. The door installation of claim 9, wherein the seal is one of a blade seal or a bulb seal.

* * * * *